INVENTOR.
Frank S. Shields
BY
ATTORNEY.

June 21, 1938.  F. S. SHIELDS  2,121,105
RUNNING REGISTER
Filed July 6, 1936   9 Sheets-Sheet 3

INVENTOR.
Frank S. Shields
BY
ATTORNEY.

June 21, 1938.  F. S. SHIELDS  2,121,105
RUNNING REGISTER
Filed July 6, 1936  9 Sheets-Sheet 4

INVENTOR.
Frank S. Shields
BY
Samuel Ostrolenk
ATTORNEY.

June 21, 1938.　　　　F. S. SHIELDS　　　　2,121,105
RUNNING REGISTER
Filed July 6, 1936　　　　9 Sheets-Sheet 5

INVENTOR.
Frank S. Shields
BY
Samuel Ostrolenk
ATTORNEY.

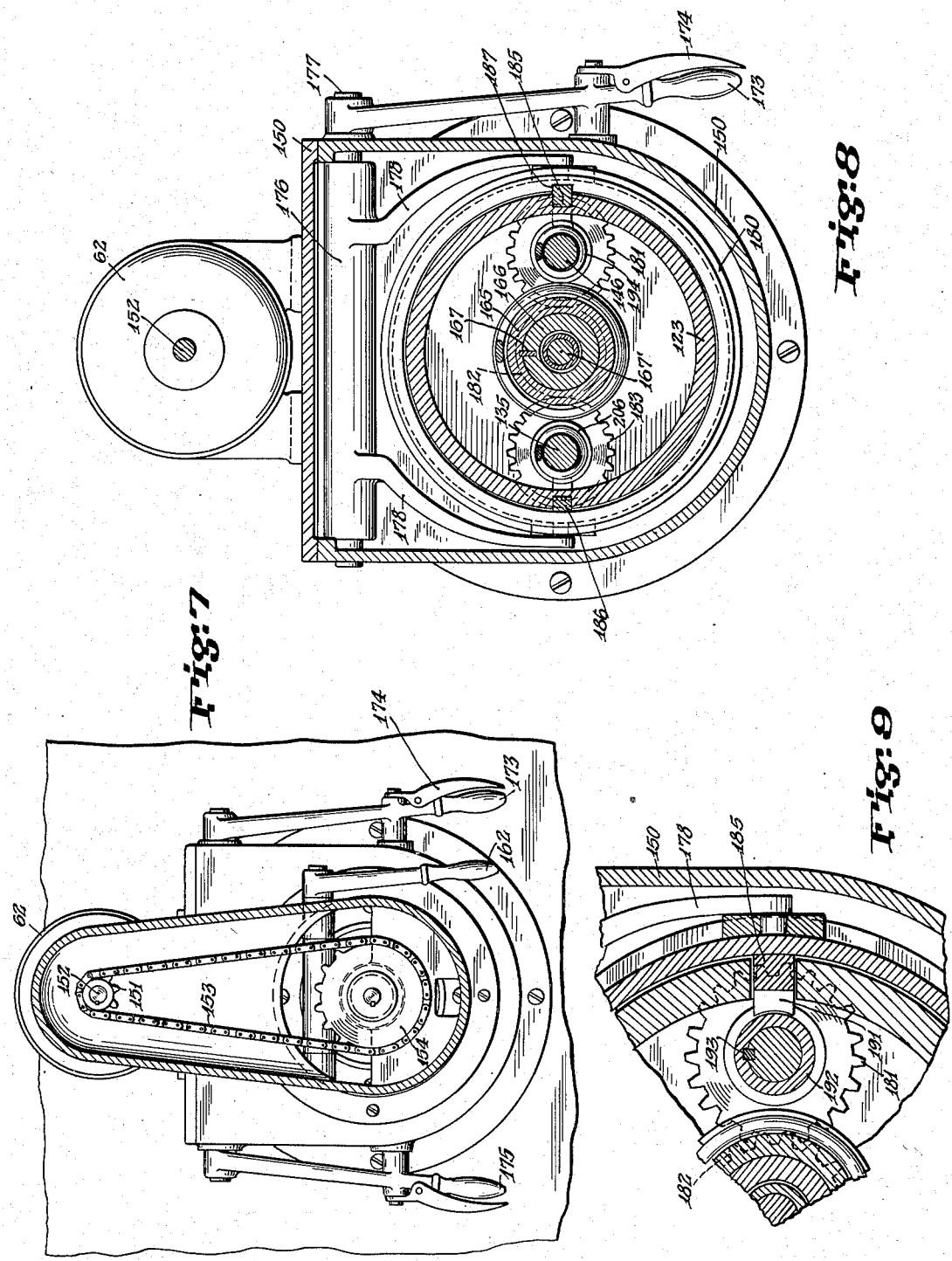

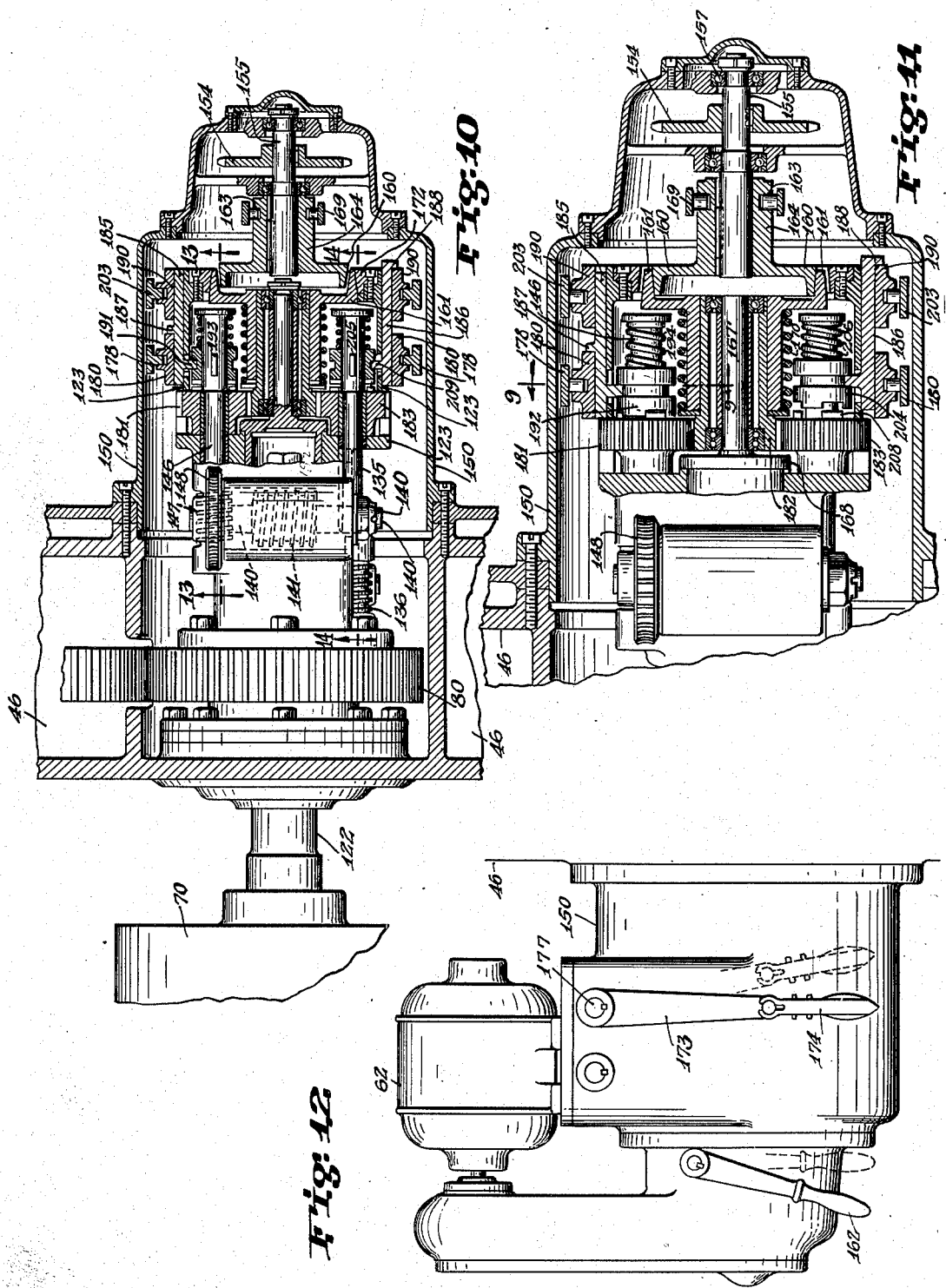

June 21, 1938.  F. S. SHIELDS  2,121,105
RUNNING REGISTER
Filed July 6, 1936  9 Sheets-Sheet 9

INVENTOR.
Frank S. Shields
BY
Samuel Ostrolenk
ATTORNEY.

Patented June 21, 1938

2,121,105

UNITED STATES PATENT OFFICE 2,121,105

RUNNING REGISTER

Frank S. Shields, Jamaica, N. Y., assignor to S. & S. Corrugated Paper Machinery Co., Inc., Brooklyn, N. Y., a corporation of New York Application July 6, 1936, Serial No. 89,017

20 Claims. (Cl. 74—395)

This invention relates to registering mechanisms and more particularly relates to novel methods of and apparatus for angular and axial adjusting means for rotating members.

Machines which operate upon advancing sheet material, for example corrugated board, box blanks and the like, generally comprise a plurality of revolving members which perform successive operations upon the sheet. These machines are adjustable for different sizes of the product and the drums are approximately set into registering position while the machine is at rest. Accurate registration of the drums, particularly of the multi-color printing and the slotting drums, is not feasible except after test runs upon the material are made.

To expedite the accurate angular and axial alignment of the successive drums, prior registering devices have been developed to perform the adjustments while the machine was in operation in order to avoid starting up and stopping. An important advantage of running registering devices is that rapid compensation for speed changes and slippage of any particular drum or of expansion or contraction of the product due to elasticity or other changes therein may be readily effected while the machine is maintained in operation.

The prior running registering devices included clutches and manual hand adjusting operations which were necessarily slow and inconvenient. I contemplate a running register mechanism which dispenses entirely with clutch engagement or disengagement of the rotating drum and maintains a positive driving connection between the rotating drum and its motive power. The registering adjustments of my present invention are performed semi-automatically. In the preferred form of my present invention, an individual reversible motor for each drum is used, the direction of rotation of the motor determining the sense of the registering adjustment.

This invention is in the nature of an improvement of my co-pending application Serial No. 75,705, filed April 22, 1936. The angular registration of this invention is effective over 360° in a clockwise or counterclockwise sense. The axial registration is effective in either direction over the predetermined distance of control. In one embodiment of this invention, particularly for printing cylinders, the axial and angular control features are embodied in a common registering mechanism operated from a reversible motor by hand lever controls. In another form of this invention, particularly for slotter heads, the angular registering portion alone is embodied in a semi-automatic 360° control.

The registration of each drum is preferably performed while the machine is running slowly so that the operator may readily determine the correct drum positions with a minimum of stock wastage. However, if the initial registration should require re-adjustment, for example due to the higher normal speed of operation or due to slippage or the like, each drum may be adjusted during any speed of its operation.

The elimination of clutch connections between the motive power and the rotatable drum is accomplished in my present invention by surrounding the registering mechanism with a sleeve which is connected to the internal mechanism which connects to the drum shaft by a worm gear arrangement to complete the positive driving connection from the drum shaft and the motive power. The angular and axial displacements of the drum shaft with respect to the external sleeve is effected by causing the rotation of a corresponding worm operating upon a worm gear cut into a sleeve, in a manner to be described in detail.

Slotter heads are generally adjusted axially before the machine is started up and circumferential adjustment alone is usually necessary during operation. My present invention is applicable to angular registration without the axial adjustments and accordingly, I disclose hereinafter a preferred embodiment of such an application.

It is accordingly an object of my present invention to provide novel methods of and apparatus for running registration of rotating drums.

Another object of this invention is to provide a novel running register which maintains a positive driving connection between the motive power and the rotatable drum.

A further object of this invention is to provide a novel semi-automatic running register for optional angular or axial drum adjustment.

Still a further object of this invention is to provide a novel semi-automatic running register for angular adjustment.

Another object of this invention is to provide a novel semi-automatic running register effective over 360° in either a clockwise or counterclockwise direction.

These and other objects of this invention will become evident in the following description taken in connection with the drawings, in which:

Figure 1 is a side elevational view of a preferred embodiment of a machine containing two printing cylinders and one registry control slotter in series, as viewed from the drum side of the machine.

Figure 7 is an end view of the printer drum adjustment control with the central housing removed, showing the operating levers and is a cross-sectional view taken along 7—7 of Figure 4.

Figure 8 is a cross-sectional view taken along 8—8 of Figure 4.

Figure 9 is an enlarged detail sectional view of a portion of Figure 8.

Figure 10 is a cross-sectional view taken along the broken line 10—10 of Figure 4 through details of the printer drum adjusting mechanism, the mechanism being in disengaged position.

Figure 11 is a slightly enlarged view corresponding to Figure 10 with the adjusting mechanism in engaged position.

Figure 12 is a side elevational view of the individual printer drum adjusting mechanism motor, and lever control.

Figure 16 is a cross-sectional view taken along 16—16 of Figure 15 illustrating the novel gear arrangement for the circumferential adjustment and corresponds to Figure 12 of the printer adjusting mechanism.

Figure 17 is the cross-sectional view taken along 17—17 of Figure 17.

Figure 18 is the cross-sectional illustration taken along 18—18 of Figure 15.

Figure 4:
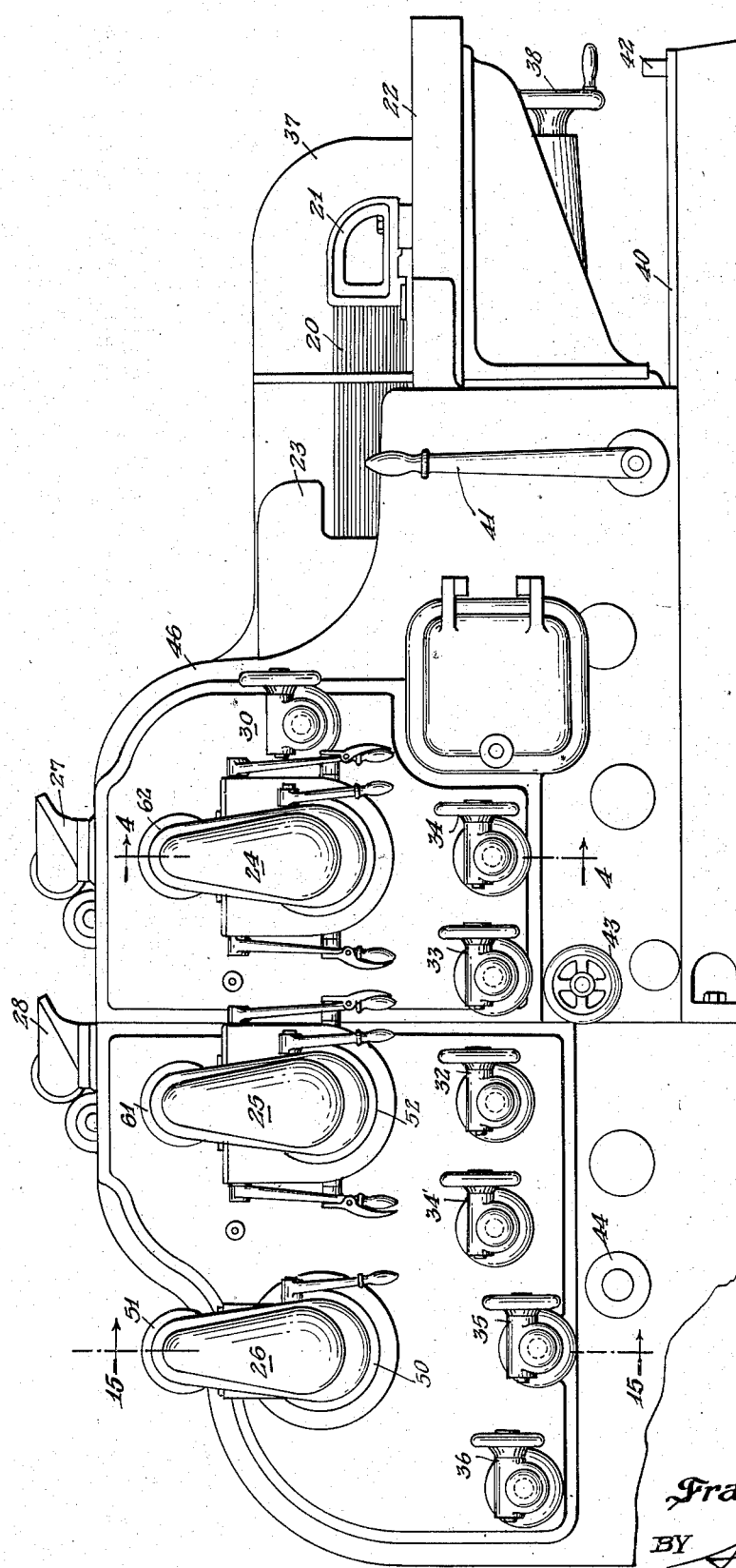
Figure 4 is a vertical cross-sectional view through a preferred embodiment for the printer drum registry mechanism in accordance with my present invention, and is taken along 4—4 of Figure 1.

The description of this invention starts with the preferred printer-slotter machine taken as a whole, then proceeds to the adjusting mechanism for the distance between each of the coacting rolls operating on the stock, then a preferred embodiment of the axial-angular registering mechanism as applied to the printing cylinders is described, continuing with the description of a slotter head register having only angular control.

Description of the printer-slotter machine

Referring to Figure 1, the sheets of corrugated board 20 are stacked in position upon the machine and the back gauge 21 is adjusted for the pile of sheets 20. A table 22 is provided for the input end of the machine. The sheets are automatically fed successively into the machine and a pair of guide plates 23 are used to keep the sheets centralized in a manner well-known in the art.

The machine of my preferred embodiment is shown with two printing drum sections 24 and 25, and one slotter section 26, arranged in series from right to left. The printing drums 24 and 25 are used for printing in two colors upon the sheet passing through the machine. Ink-wells 27 and 28 are provided for the printing drum sections 24 and 25 respectively.

Figure 2:
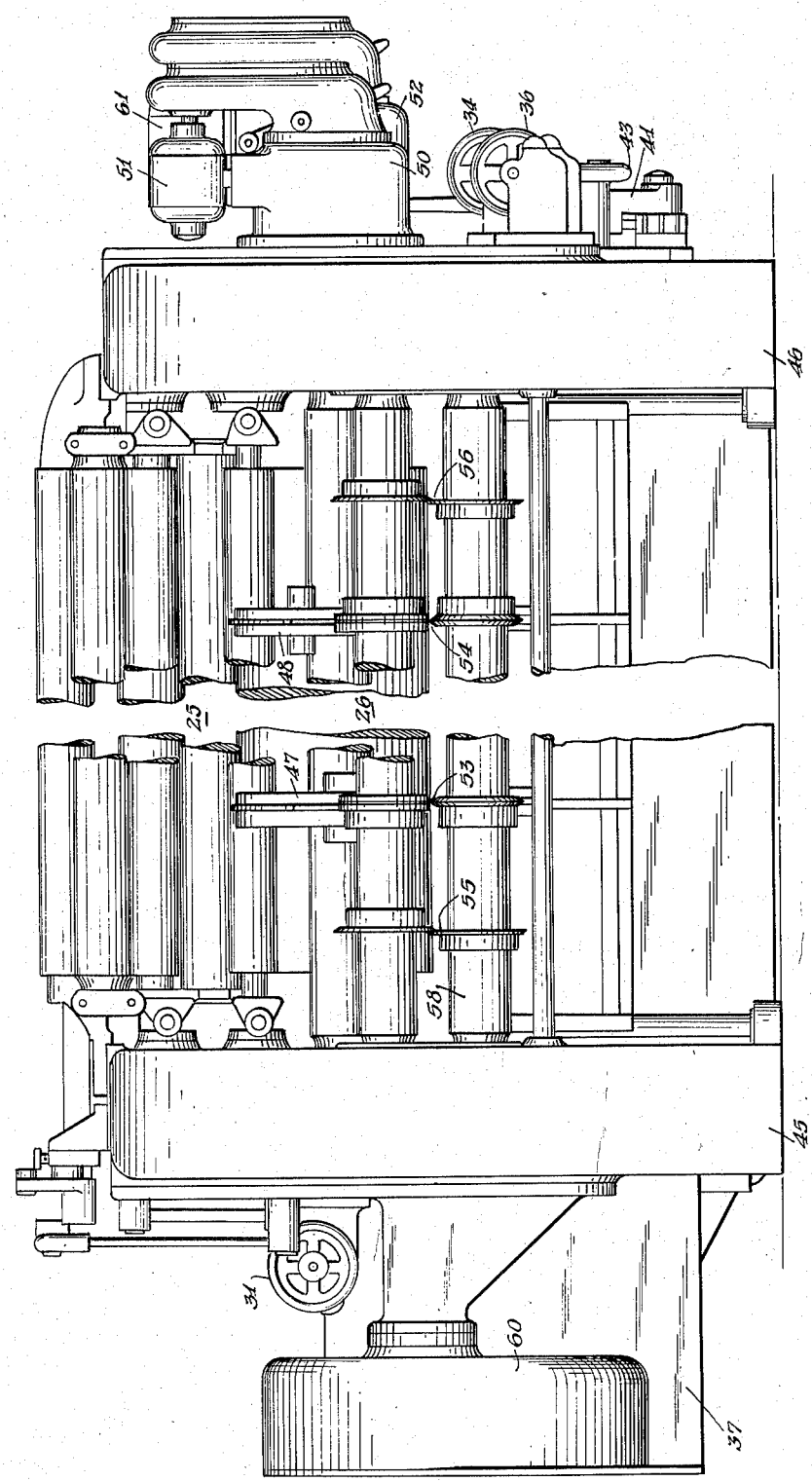
Figure 2 is an elevational view from the discharge end, broken through the central portion.

Hand adjusting mechanism 30 is provided for controlling the distance between the first or input pair of feed rolls and extends transversely through the machine, and has an independent control wheel 31 on the opposite side of the machine, as seen in Figure 2. The position of the presser roller with respect to the printing cylinder of section 24 is manually controlled by hand wheel mechanism 34; the position of the presser roller co-acting with the printing cylinder of section 25, by adjusting wheel mechanism 32. The distance between the feed rollers located between sections 24 and 25 is manually controlled by the hand wheel mechanism 33; the distance between the feed rollers located between the printing section 25 and the slotter section 26, by the hand wheel adjusting mechanism 34'. Hand wheel adjusting mechanism 35, located beneath the slotter control mechanism is provided to adjust the position of the female slotter shaft with respect to the main slotter head. Hand wheel adjusting mechanism 36 is provided for adjusting the position of the creaser and trimmer lower shaft. The plurality of hand wheel adjusting members 30 to 36 are used for adjusting the machine in accordance with the thickness of the stock being fed therethrough as will be evident to those skilled in the art.

The printer slotter machine of my preferred embodiment is driven by a synchronous motor located within the motor housing 37. The machine has an adjustable speed drive which is controlled by the hand wheel 38 which operates a Reeves pulley connected between the synchronous motor and the gearing system of the machine. It is to be understood that a different type of drive for the machine is feasible.

The printer slotter machine of my preferred embodiment is built in two separable sections, the first section contains the right end of the machine including the motor drive, the sheet stacking and feeding mechanism and the first printing cylinder; the second section comprises the remainder of the machine including the second printing cylinder, slotter, and the creaser and trimmer wheels. The right end section is movable on a set of tracks 40. Hand lever 41 is operated to separate the machine into its two major sections, the right end section being readily slidable on the tracks 40 when the lever 41 is in proper position. A stop post 42 is provided at the edge of the machine to prevent the movable section from sliding off the tracks 40. The separation of the machine between the printing sections 24 and 25 is provided to permit a person to enter therebetween and prepare the printing cylinders for operation. The removable type is mounted upon each of the wooden printer cylinders of the sections 24 and 25. A hand wheel 43 is used to lock the sections after they are brought together.

The printer slotter machine is also provided with automatic forced feed lubrication for all the parts which require lubrication. An oil gauge 44 is used to indicate the lubrication oil supply.

Figure 2 is a view of the printer-slotter machine from the discharge end as seen from the left side of Figure 1. Two major frame members 45 and 46 support the machine mechanism. The plurality of rollers of the second printing section 25 is seen in the top central portion of the machine. The slotter-creaser-trimmer section 26 comprises the lower set of rollers of Figure 2. The slotter heads 47 and 48 contain the suitable slotter dies for punching the proper slots upon the advancing stock in a manner well known in the art. The slotter heads 47 and 48 are rigidly adjusted in their proper axial position on their common shaft. The circumferential adjustment of the slotter heads is performed by the novel adjusting mechanism forming the basis of the present application and described in detail hereinafter. The vernier adjusting mechanism for the slotter section 26 is contained in housing 50 at the right end of Figure 2 and is driven by the electric motor 51. Adjacent housing 52 behind slotter control housing 50 encloses the longitudinal and circumferential adjusting mechanism for the printing cylinder of section 25, and another similar section located further behind this section is provided for the other printing cylinder.

The creasers 53 and 54 together with the trimmers 55 and 56 are located at the very end of the discharge section and are the last to operate upon the advancing stock. The creasers and trimmers are mounted upon two common steel shafts 57 and 58. The coacting members of the creasers 53 and 54 are mounted upon their respective shafts 57 and 58; and the co-acting members of the trimmers 55 and 56, are also mounted upon these shafts. The axial position of the trimmers 55 and 56 correspond to the size of the sheets required.

The creasers and trimmers require only the initial axial adjustment corresponding to the desired width of the stock and the distance between the creases. The creasers and trimmers do not require any angular adjustments since they are circular tools. The slotter heads 47 and 48 are pre-set in their axial position and require circumferential adjustment to accurately position the slotting operations upon the advancing sheet. Suitable novel semi-automatic circumferential adjusting mechanism for the slotter section 26 is described in detail hereinafter. The printing cylinders of printing sections 25 and 26 require both circumferential and axial adjustment since the two color process must be accurately imprinted upon the advancing sheet. Accurate registration of the cylinders is accordingly essential. Novel semi-automatic axial and circumferential adjusting mechanism is provided for the printing sections and is described in detail hereinafter.

The electric motor enclosed by its housing 37 is located at the left side of Figure 2. The Reeves pulley variable speed drive is enclosed in housing 60 adjacent the synchronous motor housing 37. The drive motor together with the Reeves drive, operates the gearing system which drives the printing sections 24 and 25 and the slotter-creaser-trimmer section 26. The registry mechanism for the printer and the slotter sections in my preferred embodiment are driven by small individual motors. The individual motor for the slotter registry mechanism is shown as 51 in Figures 1 and 2. The motor for the printing section 25 is shown as 61, and the motor for the printing section 24 is 62.

Figure 3:
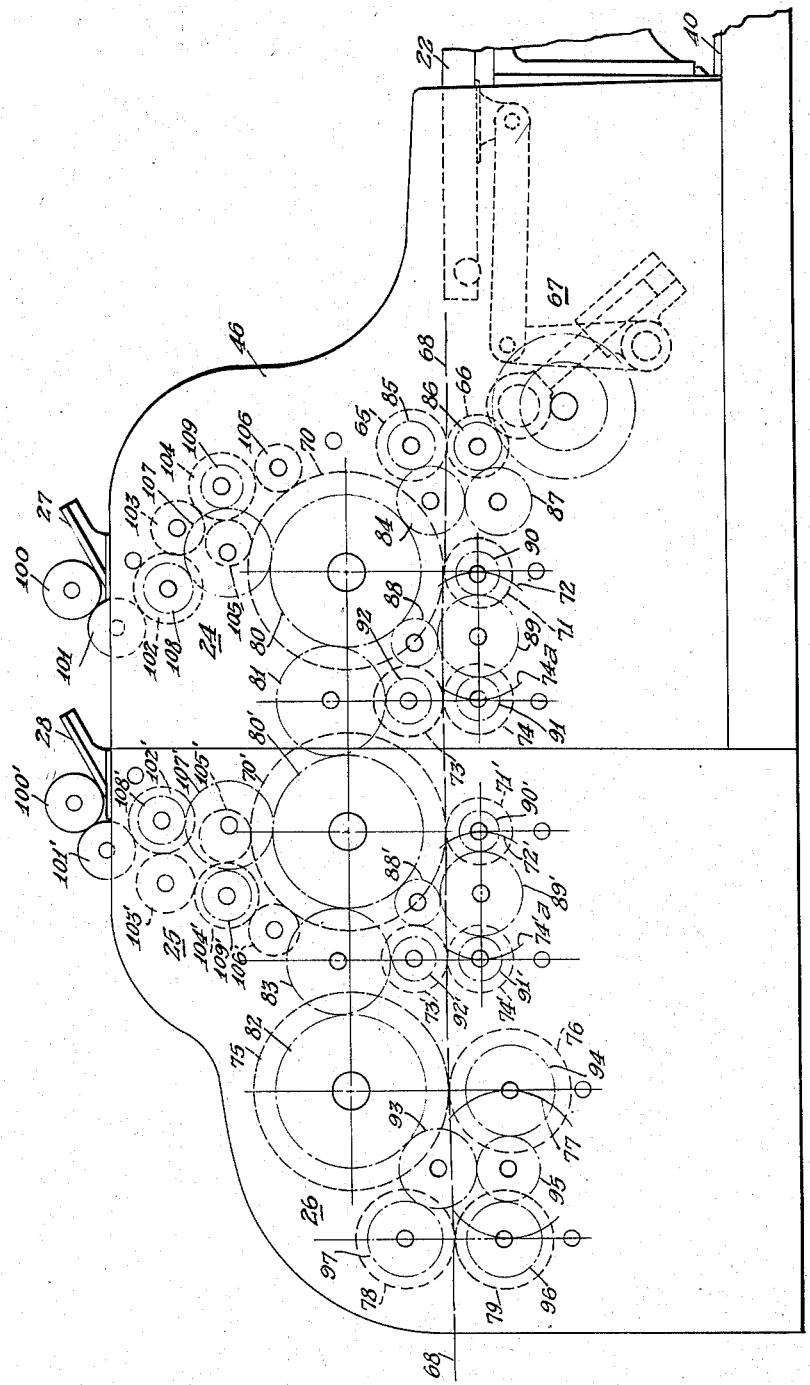
Figure 3 is a diagrammatic illustration showing the inter-relation between the various rollers and the gearing system therefor.
Figure 4:
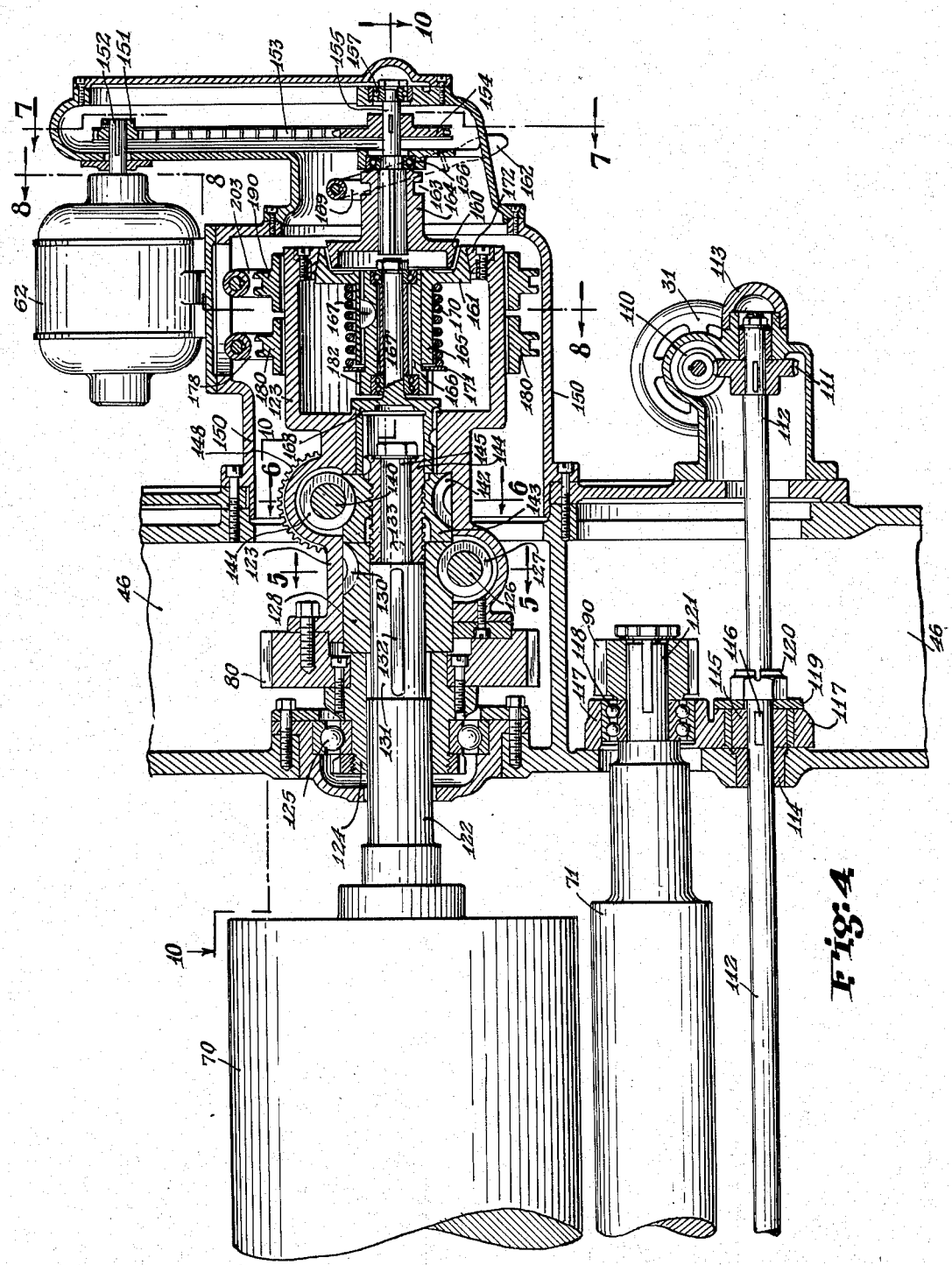

Figure 3 is a diagrammatic showing of the arrangement of the plurality of co-acting rollers of the printer-slotter machine together with the gearing system therefor. The gears are illustrated in a dot and dash line and the other parts, such as the rollers, drums and slotters are illustrated in dotted lines. The orientation of the diagram corresponds to the position of the machine as viewed in Figure 1.

The sheets from table 22 are successively introduced between the input pair of feed rolls 65—66 by means of the reciprocating pusher mechanism 67. The sheet passes through the machine along the broken horizontal line 68 schematically indicated on the diagram. The distance between the feed rolls 65—66 predetermines the pressure upon the stock. The pressure is adjustable by controlling the position of the upper feed roll 65 by means of the hand wheel adjusting mechanism 30 shown in Figure 1. The stock is then introduced between the first printing cylinder 70 and its co-acting presser roll 71 of the first printing section 24. The pressure upon the stock between the printer cylinder 70 and presser roller 71 is adjustable by means of the hand wheel adjusting mechanism 31 shown in Figure 1, which positions the presser roller 71 along the arc 72 in a manner to be described hereinafter. The revolving printing cylinder 70 prints the required impression of a predetermined color upon the sheet as it advances through the machine. The presser roller 71 maintains suitable pressure between the stock and the cylinder 70.

The sheet then moves between the revolving feed rolls 73—74 to the second printing section 25 between the second printing cylinder 70' and its co-acting presser roller 71'. The presser roller 71' is adjustable in position along the arc 72' in a manner similar to presser roller 71. The bottom feed rolls 74 and 74' are adjustable with respect to the respective rolls 73 and 73' along the corresponding arcs 74a and 74a' by their respective hand wheel mechanisms 33 and 34 as illustrated in Figure 1. The sheet continuing in its horizontal path 68, is directed by the feed rolls 73'—74' to the slotter section 26 between the main slotter head 45 and the co-acting female slotter head 76. The distance between the slotter sections 75 and 76 is adjustable by the hand wheel mechanism 35, shown in Figure 1 along the arc 77, the mechanism being similar to that hereinafter described in connection with presser roller 71. After the slotting operation, the sheet is moved to the creaser-trimmer rolls, schematically indicated by dotted circles 78 and 79 corresponding to the creasers 53—54 and trimmers 55—56 mounted on shafts 57 and 58 as illustrated in Figure 2.

The gear system for the machine is all interconnected and driven by the main synchronous motor hereinabove referred to. Printing cylinder 70 has mounted on its shaft gear 80 which is interconnected with the gear 80' connected to the second printing cylinder 70' through the intermediate gear 81. The gear 80' is interconnected with the gear 82 connected to the slotter 75 through the intermediate gear 83. The input feed rollers 65 and 66 are driven from the gear 84 meshing with gear 80 and the auxiliary gears 85, 86 and 87.

The presser roller 71 is driven by gear 88 meshing with gear 90 being connected to the shaft of presser roller 71. Gear 89 also drives roll 74 through its gear 91. The upper feed roll 73 is driven from gear 81 meshing with its gear 92. The presser roller 71 and the roll 74, when adjusted along the corresponding arcs 72 and 74a preserve the co-acting relationship with their common drive gear 89 since the arcs 72 and 74a are concentric with gear 89. The lower presser roller 71' and the feed rolls 73'—74' of second printing section 25 are driven in a manner similar to the corresponding components of the first printing section 24 in a similar manner by gears labeled with the same numerals primed.

The female slotter 76 is driven by gear 93 meshing with the gear 82 of slotter head 75. Gear 93 drives the gear 94 of female slotter 76 through the intermediate gear 95. Gear 95 also drives the lower creaser-trimmer 79 through its gear 96. Gear 93 drives the upper creaser-trimmer 78 through its gear 97.

The inking mechanism for the printing sections 24 and 25 are similarly constructed and are herein described in connection with section 24, the second section 25 being labeled with corresponding numerals primed. The ink roller 100 absorbs on its surface, the ink from the ink-well indicated at 27. The ducker roller 101 transfers the ink from the surface of ink roller 100 to the steel oscillating roller 102. The steel roll 102 spreads the ink upon the rubber or composition transfer roll 103 to the steel oscillating roller 104. The ink is evenly spread upon the steel roll 104 and is transferred to the type on the surface of the printing cylinder 70 through the composition transfer rollers 105 and 106.

The inking cylinders 100 to 106 are driven from the gear 80 through the intermediate gear 107 which drives the steel oscillating rollers 102 and 104 at their respective gears 108 and 109.

Roller pressure adjusting mechanism

The rollers of the printer slotter machine are arranged in pairs, for example, the printing cylinders, the feed rollers, the slotter heads 75—76 and the creaser-trimmer rollers 78—79. The vertical position of one roller of each pair is manually adjustable to accommodate different stock thicknesses by the hand wheel mechanisms 30 to 36, illustrated in Figure 1. Figure 4, which is a vertical cross-sectional illustration through the printing cylinder adjusting mechanism illustrates in section the operation of the adjustment for the lower printing cylinder or presser roller 71.

The hand wheel 31 drives a worm 110 which rotates worm gear 111 keyed to shaft 112. The worm of worm gear arrangement 111—112 is encased in a housing 113 attached to one side of the frame section 46. The adjusting shaft 112 extends through the frame 46 to the opposite side of the machine. Shaft 112 is supported in bushing 114 in frame member 46. An eccentric cam 115 is keyed to shaft 114 by key 116. A metallic plate 117 surrounds the eccentric cam 115 and extends upwardly to support the presser roller 71 in roller bearing 118. A washer 119 and nut 120 hold the metallic plate 117 and eccentric cam 116 in position upon rod 112 and against the corresponding surface of frame member 46. Metallic plate 117 is movable vertically and its vertical height depends upon the orientation of the eccentric cam 115 which is under the control of the hand wheel 31 which rotates the position of cam 115.

The lower printing or presser roller 71 is rotatably supported in roller bearing 118 set into the adjustable plate 117 at one end of the machine and is supported on its opposite side by a similar structure under the control of the corresponding end of shaft 112. Spur gear 90 is keyed on a shoulder 121 extending from the shaft of presser roller 71. The gear 90 meshes with the intermediate gear 89 schematically illustrated in Figure 3.

By proper rotation of the hand wheel 31 in a clockwise or counterclockwise direction, the relative distance between the printing cylinder 70 and the presser cylinder 71 is obtained. Gear 90 is maintained in constant meshing relationship with its driving gear 89 as illustrated in Figure 3. The hand wheel 31 contains self-locking mechanism which maintains it in a locked condition between adjustments. Both supports of the movable cylinder 71 are controlled simultaneously so as to maintain the cylinders horizontally and in true parallel relationship.

The adjusting mechanism herein described for the pressure or distance between the co-acting rollers is of similar construction to the illustrated embodiment shown in Figure 4, in conjunction with the printing cylinders 70 and 71. The distance between the rollers depends upon the thickness of the stock passing through the machine as well as its compliance.

Printer drum registering mechanism

The printing cylinder 70 requires accurate angular and axial adjusting mechanism which functions while the machine is in operation to expedite precise positioning of the printing impressions upon the sheet so that impressions of different colors will be accurately superimposed. In Figures 4 to 14, I have illustrated a preferred embodiment for carrying out the principles of my present invention. Although I have illustrated this mechanism in conjunction with a printer drum, it is to be understood that it is equally applicable to any rotating member which requires circumferential and axial alignment.

The drum 70 is rotated through gear 80 which connects to the shaft 122 through the sleeve 123 and the control mechanism for the drum 70 located within the sleeve 123 as will be evident upon further description of the details of the control mechanism. Shaft 122 of the cylinder 70 is located within sleeve 124 and is free and slidable therein. Sleeve 124 is supported in roller bearing 125 attached to the frame member 46. Sleeve 124 is rigidly connected to gear 80 as is the housing sleeve 123. Gear 80 is continuously rotated from the gearing system extending from the main drive synchronous motor. The housing sleeves 123 and 124 rotate with the gear 80 as a unitary structure and the registering mechanism located within the housing sleeves rotate therewith in unison to correspondingly positively drive the drum 70. A feature of my present invention is to semi-automatically control the angular or axial position of the revolving drum 70 by superimposing corresponding correcting motions upon the drum while maintaining its positive driving connection to the driving source.

The circumferential adjustment of the drum 70 is effected by the rotation of the shaft 126. Shaft 126 is semi-automatically rotated under the control of the operator in a manner to be described hereinafter. A worm 127 is integral with the shaft 126 and accordingly rotates therewith. A sleeve 128 concentric within housing sleeve 123, has a set of worm gear teeth 130 cut on its periphery. The worm gear 130 co-acts with the worm 127. A shoulder 131 extending from the shaft 122 has a key 132 set therein which rides in a keyway 133 cut into the sleeve 128.

Drum 70 accordingly rotates with sleeve 128 under the action of the key 132. The shoulder 131 of the drum shaft is slideable with respect to the sleeve 128 but rotatable therewith. Rotation of shaft 126 will cause the sleeve 128 to revolve and the drum 70 will revolve therewith.

Figure 5:
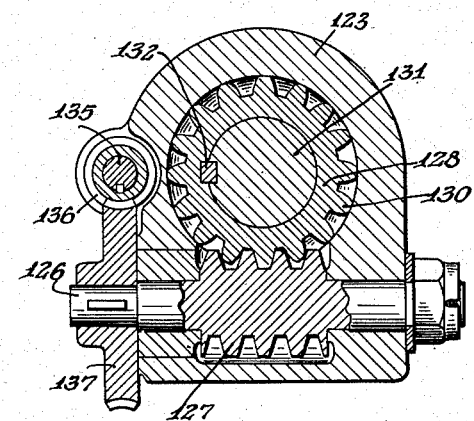
Figure 5 is a cross-sectional view taken along 5—5 of Figure 4 illustrating the novel gearing arrangement for the circumferential adjustment of the printer drum.

Figure 5 is a cross sectional view taken along 5—5 through the circumferential control mechanism portion of Figure 4. The worm shaft 126 is shown rotatably supported in the housing sleeve 123 and moves as a unit as the sleeve 123 rotates. The worm 127 meshing with the worm gear 130 accordingly rotates the sleeve 128 together with sleeve 123. The interlocking relationship between the worm 127 and worm gear 130 causes the sleeve 128 to rotate integrally with the housing sleeve 123 and therefore gear 80. Since the cylinder 70 is keyed to the sleeve 128, it normally rotates in a positive driving relationship with gear 80. However, rotation of the worm 127 will superimpose a rotation clockwise or counterclockwise upon the normally rotating sleeve 128 to correspondingly superimpose the circumferential adjusting motion upon the rotation of the drum 70. It will be evident that the angular correction of drum 70 is effected while maintaining a positive driving connection between the drum 70 and its driving gear 80.

The rotation of worm shaft 126 is under the control of the motor power and mechanism to be hereinafter described, which rotates rod 135 (Figure 5). A worm 136 keyed to rod 135 engages with a worm gear 137 keyed to one end of the worm shaft 126. Rotation of rod 135 will accordingly superimpose a clockwise or counterclockwise motion upon the normally rotating shaft 131 supported within the housing sleeve 123.

The axial adjusting mechanism for the cylinder 70 is under the control of the rotation of shaft 140 as viewed in Fig. 4. Shaft 140 contains integral therewith, a worm 141 which meshes with a worm gear 142 cut upon the periphery of sleeve member 143 concentric with the housing sleeve 123. A series of threads is cut upon the internal surface of the sleeve member 143 which threads co-act with a threaded sleeve 144. Threaded sleeve 144 is rotatably mounted upon an extension 145 of the cylinder shaft 122.

Rotation of worm shaft 140 revolves its integral worm 141 which superimposes a corresponding clockwise or counterclockwise motion upon the sleeve 143. Rotation of sleeve 143 coacts with the threaded sleeve 144 to move it to the right or left. Since sleeve 143 is constrained from movement to the right or left, the threaded sleeve 144 necessarily moves axially in response to the rotation of the sleeve 143.

Threaded sleeve 144 is held from axial movement with respect to the shaft extension 145 by means of a shoulder and a nut and washer at its right end. Axial movement to the right or left of the threaded member 144 correspondingly moves the cylinder 70 which is otherwise slidably mounted.

Figure 6:
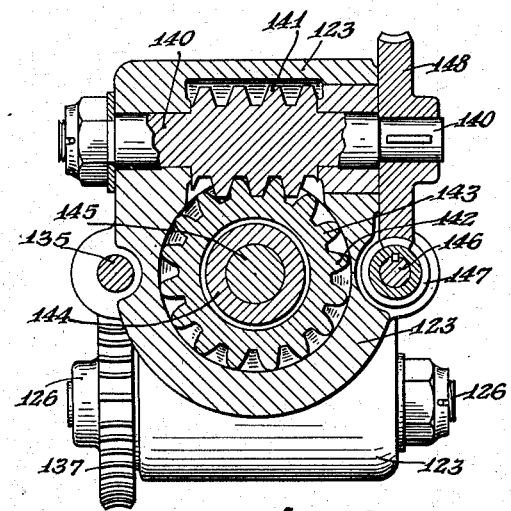
Figure 6 is the cross-sectional view taken along 6—6 of Figure 4 illustrating the novel gearing arrangement for the axial alignment of the printer drum.

Figure 6 is a cross-sectional view taken through the axial adjusting mechanism of Figure 4. The worm shaft 140 is rotatably supported in housing sleeve 123. Rod 146 controlled by power drive mechanism hereinafter described, is mounted on sleeve 123 and has a worm 147 keyed to it. Worm 147 meshes with worm gear 148 which is keyed to the worm shaft 140. Rotation of the axial control rod 146 accordingly superimposes a clockwise or counterclockwise rotation upon the sleeve 143 which correspondingly shifts the threaded sleeve 144 to the right or left and accordingly controls the axial position of the cylinder 70.

The circumferential and axial control mechanism is actuated by motive power from the reversible electrical motor 62 under the control of the operator. As viewed in Figure 4, motor 62 is supported upon the casing 150 enclosing the registering mechanism. A sprocket wheel 151 is keyed to the shaft 152 of the motor 62. A sprocket chain 153 transmits the motive power to a sprocket wheel 154 coaxial with the cylinder 70. Sprocket wheel 154 is keyed to a shaft 155 supported in roller bearings 156 and 157 in the casing structure.

A friction clutch is used for manually engaging and disengaging the motive power to the registry control mechanism. The inner friction cone member 160 is slideably keyed to an extension of shaft 155 and its position is controlled by hand lever 162 operating a yoke 169 coacting with a groove 163 on the hub 164 of friction cone 160. The outer friction cone 161 has a hub portion 165 which is slideably keyed to sleeve 166 by feather key 167. Sleeve 166 is rotatably mounted by two roller bearings upon a rod 167' integral with and extending from a sleeve 168 keyed to the housing sleeve 123.

A helical spring 170, concentric on the hub 165 of clutch member 161, mechanically biases clutch member 161 away from a washer 171 set against a shoulder of sleeve 166. The outer surface of friction cone 161 normally engages an annular ring 172 attached to the right end portion of sleeve 123. When clutch 160—161 is in disengaged position, as illustrated in Figure 4, spring 170 forces the outer clutch member 161 into engagement with ring 172. Clutch member 161 accordingly rotates together with the sleeve 123 in correspondence with the motion of the gear 80. When friction clutch 160—161 is engaged by hand lever 162, spring 170 is compressed and clutch member 161 is released from the annular ring 172 and is under the control of the motive power from the reversible motor 62 as will be hereinafter described in greater detail.

Figure 7 is the sectional view taken along 7—7 of Figure 4 showing the end view of the sprocket drive from the motor 62 to the sprocket wheel 154. Lever 162 is the clutch engaging and disengaging lever to actuate the circumferential and axial registering mechanism through the friction clutch 160—161 in a manner to be hereinafter described. The lever 162 is manually held in position during the registering operations and is intermittently operated to effect precise results. The hand lever 173 is a self-locking lever which controls the axial registering section of the registering mechanism and determines whether the axial movement of the drum 70 will be effected when the clutch lever 162 is in engaged position. Plate 174 attached to the handle of lever 173 permits ready release of the detent locking portion of the lever (not shown) to permit resetting thereof. A similar lever 175 located opposite lever 173 is an independent control for determining when the angular registering portion of the registering mechanism will be actuated if the clutch lever 162 is in engaged position. The operator merely throws lever 173 or 175 (or both) into control position for corresponding control of the circumferential or axial registration of the drum, and then intermittently operates the clutch lever 162 to effect the registration desired.

Figure 8 is the cross-sectional view taken along 8—8 of Figure 4, being a vertical section through the registering control mechanism. Hand lever 173 which controls the operation of the axial registry mechanism operates a sleeve 176 attached to a rod 177 secured to one end of lever 173. Arms 178—178 extending from sleeve 176 form a yoke which sets into an annular groove in ring 180. The axial position of ring 180 controls the engagement of a spur gear 181 with the axial control rod 146 in a manner to be described hereinafter. The rod 146 controls the axial registration of the drum 70 in a manner hereinabove described in connection with Figures 4 and 6. Spur gear 181 is normally free to rotate with respect to rod 146 and engages with a central spur gear 182. The spur gear 182 is integral with the sleeve 166 as illustrated in Figure 4. A spur gear 183 rotatably mounted on rod 135 also coacts with central gear 182. As will be hereinafter described, the hand lever 175 (Figure 7) controls, in a manner similar to lever 173, the engagement of the spur gear 183 with rod 135. The rod 135 controls the angular or circumferential registration of the drum in a manner hereinabove described in connection with Figures 4 and 5.

Figure 10 is a horizontal cross-sectional view taken along 10—10 of Figure 4 illustrating the mechanism for the operation of the angular and axial control rods 135 and 146 by the motive power imparted to shaft 155 from the associated electric motor 162. The arms 178—178 forming the yoke operated by hand lever 173 as described in connection with Figure 8, have tongues extending into the corresponding annular groove of ring 180. The metallic ring 180 encircles the corresponding extension of housing sleeve 123 (see Figure 4). Keys 185 and 186 are inserted on opposite sides in the sleeve 123 and contain corresponding projections 187 and 188. The projection 187 of key 185 abuts one edge of the ring 180. The projection 188 at the right end of key 186 abuts the outside edge of a second circular ring 190 corresponding to ring 180 and mounted adjacent thereto as shown in Figures 10 and 11.

The keys 185 and 186 control the engagement of corresponding rods 146 and 135 for effecting the control of the related axial and circumferential registering mechanism. Key 185 contains a tongue 191 which co-acts with an annular groove in the hub of positive clutch member 192. Clutch member 192 is slideably keyed by key 193 on the end portion of rod 146. Figure 9 is an enlarged view of a corresponding portion of Figure 8, and shows another view of the key 185 with its tongue 191 co-acting with clutch member 192.

The yoke 178—178 (operated by lever 173) controls the movement of ring 180. When ring 180 is moved towards the right, it abuts projections 187 of key 185 and accordingly moves key 185 towards the right. The tongue 191 of key 185 will correspondingly move clutch member 192 toward the right against the spring action of spring 194.

Figure 13:
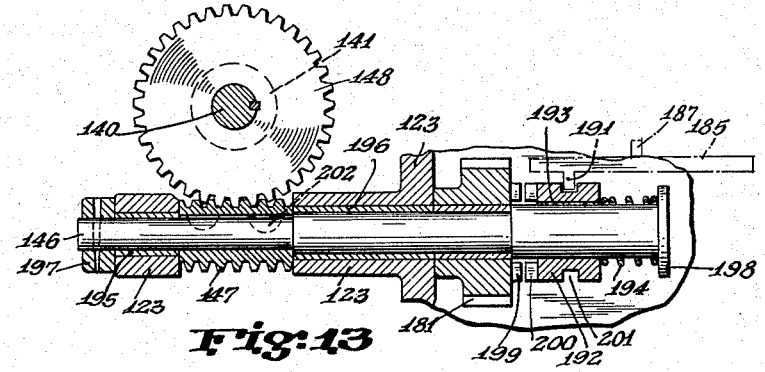
Figure 13 is the cross-sectional view taken along 13—13 of Figure 10.

Figure 13 is a cross-sectional view taken axially along rod 146 along 13—13 of Figure 10. Rod 146 is rotatably mounted in bushings 195 and 196 set into the housing sleeve 123. The left end of rod 146 has a nut 197 pinned thereto. The spring 194 at the right end of rod 146 abuts the head 198 of the rod 146 and normally mechanically biases positive clutch member 192 into engagement with the co-acting positive clutch member 199. The teeth of the positive clutch 199 are cast integral with the spur gear 181. The teeth 200 of the positive clutch member 192 form a positive driving connection between the clutch member 192 and the spur gear 181.

The annular groove 201 in clutch member 192 co-acts with the tongue 191 of key 185. When key 185 is moved toward the right by ring 180 abutting projection 187, clutch teeth 199 and 200 are disengaged since clutch member 192 is moved against the biasing spring 194. However, when lever 173 moves ring 180 toward the left, biasing spring 194 moves clutch member 192 along rod 146. A positive engagement of the clutch teeth 199—200 is made whereby a positive driving connection is made between spur gear 181 and the rod 146 through the clutch member 192 keyed thereto. Spur gear 181 accordingly controls the rotation of worm 147, keyed by keys 202 to rod 146. Worm 147 meshes with worm gear 148 which is keyed to the shaft 140 which directly controls the axial registering mechanism hereinabove described in connection with Figures 4 and 6.

The engagement of the angular control rod 135 with the spur gear 183 is similar to the hereinabove described relation between the axial control rod 146 and the spur gear 180. Referring to Figure 10, sleeve 190, the position of which is controlled by yoke 203—203, operated by hand lever 175 (Figure 7), abuts the projection 188 of key 186. When ring 190 is moved by lever 172 to the right, it abuts projection 188, moving key 186 correspondingly towards the right to the position illustrated in Figure 10. The tongue 209 of key 186 co-acts with the annular groove of the positive clutch member 204 which is slideably keyed by key 205 on rod 135.

Figure 14:
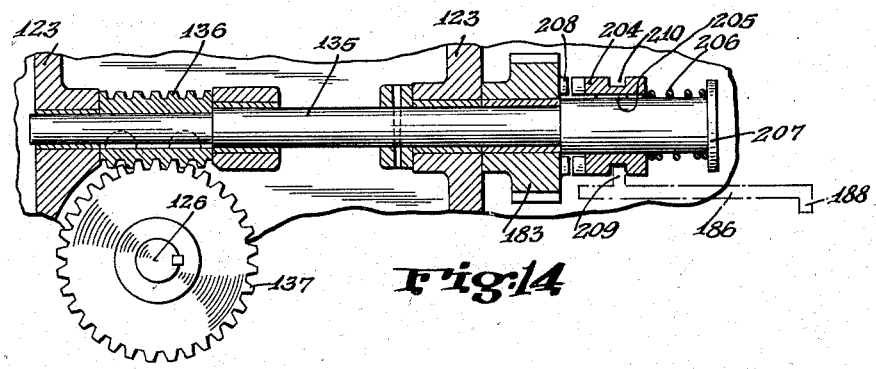
Figure 14 is the cross-sectional view taken along 14—14 in Figure 10.

Figure 14 is a cross-sectional view taken through the control rod 135 along 14—14 of Figure 10. A spring 206 set between the head 207 of rod 135 and the clutch member 204, normally mechanically biases the clutch member 204 into engaging position with the clutch teeth 208 integrally cast with spur gear 183. The tongue 209 of key 186 co-acts with the annular groove 210 of the clutch member 204 to axially move the clutch member 204 against the biasing spring 206 to the illustrated disengaged position. When hand lever 175 moves sleeve 190 towards the left, spring 206 moves the clutch member into engaged position with clutch teeth 208 and the spur gear 183 is correspondingly engaged with slidable clutch member 204. A positive driving connection is had between the angular control rod 135 and the spur gear 183. Accordingly, when the positive clutch member 204 is in engaged position, spur gear 183 drives worm 136 which meshes with worm gear 137. Worm gear 137 drives shaft 126 which directly controls the circumferential adjusting mechanism in a manner hereinabove described in connection with Figures 4 and 5.

Referring again to Figure 10, spur gears 181 and 183, free to revolve upon their respective shafts 146 and 135, are in constant meshing relationship with the central gear 182. It is to be understood that the whole mechanism illustrated within the casing 150 rotates together with the drum 70 when gear 80 revolves. Accordingly, control shafts 146 and 135 normally revolve in a circular path co-axial with the shaft 122 of drum 70. With clutch 160—161 in disengaged position as shown, the central gear 182 revolves together with the revolving hub 123 since gear 182 is keyed to the hub of the outer clutch cone 161 which engages the annular ring 172, set into the casing 123. Gears 181, 182 and 183 accordingly rotate about the drum 70 axis but do not revolve with respect to each other but remain in intermeshed relationship as will be evident to those skilled in the art.

When lever 173 is operated to move the yoke 178—178 and the ring 180 to the left, spring 194 forces positive clutch member 192 into engagement with the spur gear 181. As long as friction clutch 160—161 is disengaged, the shaft 146 does not rotate. However, by throwing the friction clutch 160—161 into engagement by hand lever 162 (Figure 7) operating on yoke 169, the outer friction cone 161 moves to the left against the biasing action of the spring 167 away from engagement with the annular ring 172.

Figure 11 illustrates the positive clutch member 192 in engaged position with the spur gear 181 and also the friction clutch 160—161 in engaged position. The motive power from shaft 155 is accordingly transmitted directly to intermediate gear 182 which, in turn, rotates the spur gear 181. Rotation of spur gear 181 operates axial control shaft 146 and the drum 70 moves axially to the right or left in accordance with the clockwise or counterclockwise rotation of shaft 155 in a manner hereinabove described in connection with Figures 4, 6 and 13. The alternate sense of rotation of shaft 155 is obtained by utilizing a reversible electrical motor 62. Rotation of the motor in one direction will correspond to the registration of the drum 70 to the left; and rotation of the motor in the opposite direction, correspondingly to the right.

In a similar manner, the angular registration of the drum 70 is accomplished by throwing lever 175 (Figure 7) to move yoke 203—203 together with ring 190 to the left to permit clutch member 204 to become positively engaged with spur gear 183 under the action of biasing spring 206. The engagement of clutch member 204 with spur gear 183 causes the central gear 182 to drive the angular control shaft 135 in a manner hereinabove described in connection with Figures 4, 5 and 14. The angular registration is clockwise or counterclockwise in accordance with the predetermined sense of rotation of the reversible motor 62 which drives shaft 155.

From the foregoing it will now be evident that the semiautomatic printing drum aligning mechanism of my present invention permits the axial or angular alignment of the drum to be made from the power of a reversible motor associated with the printer drum. Figure 12 is an end elevational view of the motor mounted on the control mechanism casing 150 also showing the hand levers 162 and 173 corresponding to the right hand side of Figure 7. The hand lever 173 controls the engagement of the axial control mechanism and when thrown to the dotted position, engages the positive clutch member 192 to place the axial control mechanism in operative relationship with respect to the motor 162. By then operating the friction clutch lever 162 to the dotted position, the motive power for motor 62 will be transmitted through the friction clutch 160—161 to the engaged axial control mechanism to effect the axial movement of the drum 70. On the opposite side of Figure 12 is located the hand lever 175 (see Figure 7) which operates the engagement of the positive clutch member 204 to place the angular registering mechanism in operative relationship with motor 62. Engagement of the friction clutch by hand lever 162 will cause the angular registration of the drum 70 in accordance with the sense of rotation of the reversible motor 62. It is to be understood that the axial and angular adjustments may be effected simultaneously. However, a more flexible control is had when they are independently operated. Motor 162 may be operated by a control button arrangement by the operator to control its speed and sense of rotation.

*Slotter-head adjusting mechanism*

Figure 15:
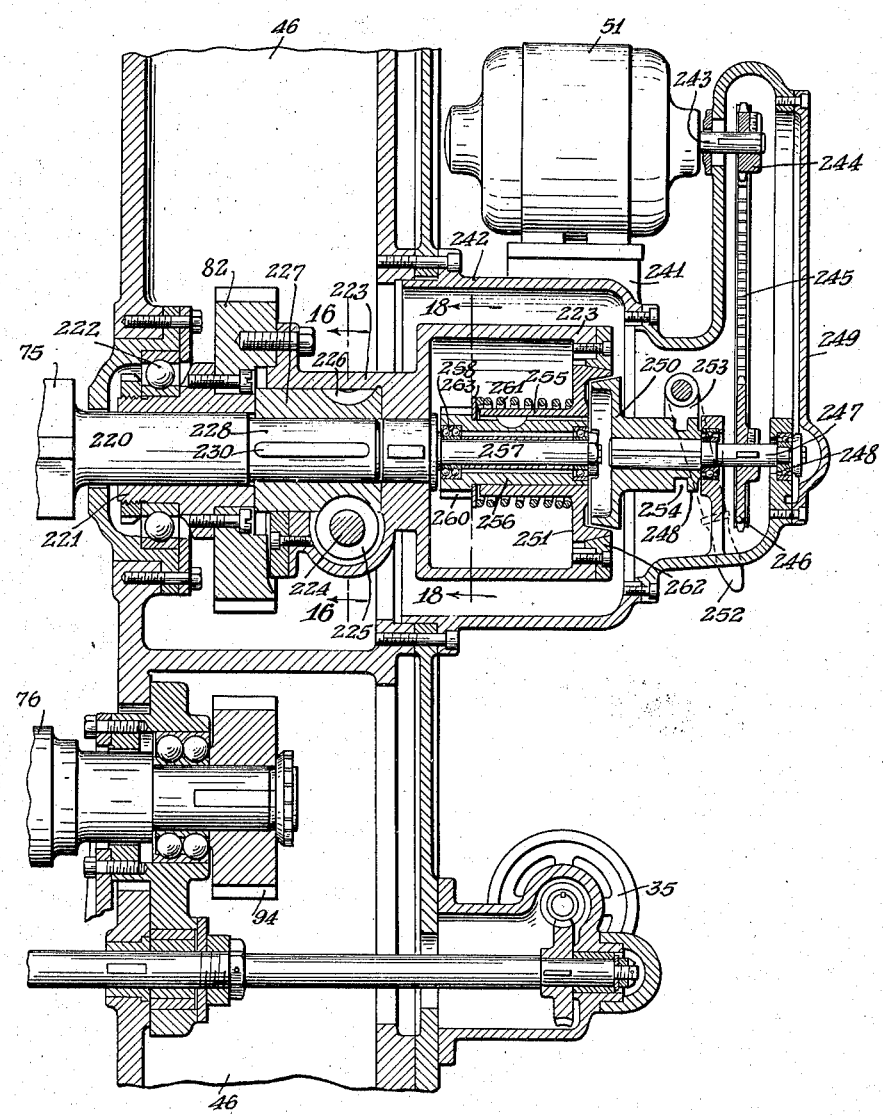
Figure 15 is a vertical cross-sectional view taken along 15—15 of Figure 1, through a preferred embodiment of the circumferential adjusting mechanism for the slotter head, being a modification of the printer registry mechanism and corresponds to Figure 4.
Figure 48:
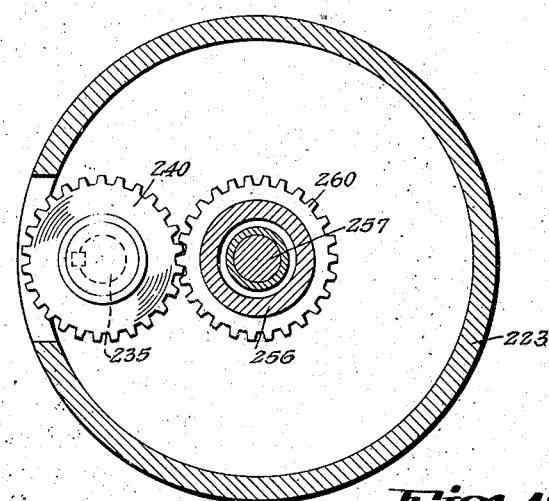
Figure 46:
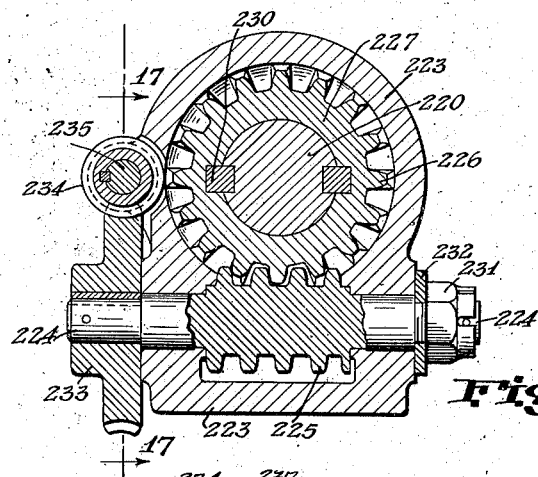
Figure 47:
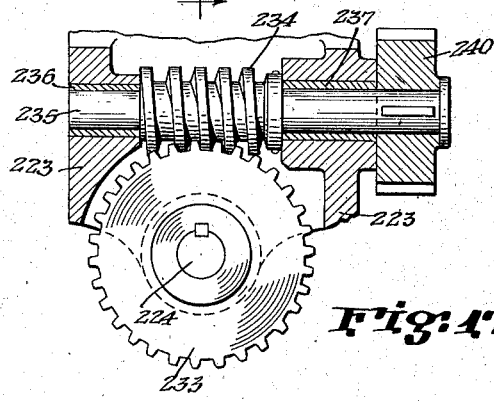

The slotter head, as already described, requires only an angular registering control in the printer-slotter machine. Figure 15 illustrates a preferred embodiment for effecting the angular control of the slotter in accordance with my present invention. This control is similar to the control of the printing cylinders but is simplified by the elimination of the axial portion thereof. The shaft 220 of the slotter head 75 is rotatably mounted in sleeve 221 which is fastened to a corresponding portion of frame 46 by roller bearing 222. Gear 82 connected to the gearing system, as illustrated in Figure 3, drives the slotter head shaft 220 through the housing sleeve 223 bolted to the gear 82 and connected to the shaft 220 through the internal control mechanism. Shaft 224 mounted in sleeve 223 is rotated by mechanical connections to the motor 51 to effect the angular registration of the slotter 75. A worm 225 cast integral with shaft 224 engages a worm gear 226 cut into the sleeve 227 concentric within housing sleeve 223. The shoulder 228 extending from shaft 220 is keyed with key 230 to sleeve 227. Rotation of shaft 224 accordingly superimposes a corresponding motion upon sleeve 227 which effects the angular registration of slotter head 75.

Figure 16 is a cross-sectional view through the angular adjusting mechanism within housing sleeve 223 as taken along 16—16 of Figure 15. Shaft 224 is journalled in housing sleeve 223 and contains a nut 231 pinned to the right end portion thereof adjacent a washer 232. The left end of shaft 224 has a worm gear 233 attached to it which meshes with worm 234 in turn keyed to angular control shaft 235.

Figure 17 is the cross-sectional view through the control rod 235 taken along 17—17 of Figure 16. The control rod 235 is journalled in bushings 236 and 237 set in housing sleeve 223. Worm 234 keyed to rod 235 meshes with the worm gear 233 which controls the shaft 224 which effects the angular registration of the slotter head 75. A spur gear 240 is keyed to one end of control rod 235. The rotation of spur gear 240 will accordingly rotate worm gear 233 by the worm 234 to effect angular registration of the slotter head shaft 220 as will now be evident to those skilled in the art.

The motive power for effecting the angular registration is obtained from reversible motor 51 mounted upon a base 241 extending from casing 242 enclosing the registering mechanism. The shaft 243 of motor 51 is keyed to a sprocket wheel 244 which operates a sprocket chain 245 meshing with a sprocket wheel 246 keyed to shaft 247. Shaft 247 is supported in roller bearings 248 secured to the housing 249. The extension of rod 247 is secured to the inner friction cone 250 of friction clutch 250—251. The engagement of friction clutch 250—251 is controlled by hand lever 252 operating a yoke 253 co-acting with annular groove 254 in the hub of friction cone 250.

The hub 255 of the outer friction cone 251 is keyed to sleeve 256 rotatably supported about extension shaft 257 extending from the end of the slotter head shaft 220 upon roller bearings 258. A spur gear 260 is cast integral with the left end of sleeve 256. A spring 261 mechanically biases friction cone member 251 into engagement with an annular ring 262 mounted at the right end of housing sleeve 223, the opposite end of spring 261 abutting a washer 263 set against the gear 260.

Figure 18 is a cross-sectional view taken along 18—18 of Figure 15 illustrating the engagement of the gear 260 with the spur gear 240. Gear 240 is directly keyed to the angular control shaft 235 and gear 260 is directly keyed to the outer friction cone 251. When the hand lever 252 throws the friction clutch 250—251 into engagement, the clutch member 251 will move away from the annular ring 252 and the gear 260 will be directly rotated by the shaft 247 motivated by the motor 251. Rotation of gear 260 will correspondingly rotate spur gear 240 to effect the angular registration of slotter head 75 in a manner described in connection with Figures 15, 16 and 17. The sense of the angular correction will correspond to the direction of rotation of the motor 51. When the clutch 250—251 is disengaged, the gears 240 and 260 will merely remain intermeshed not revolving with respect to each other, the outer gear 240 moving in a circular path about the gear 260 which rotates together with the slotter head driven by gear 82.

The angular control is effective over 360° and is effected in a clockwise or counterclockwise direction in accordance with the rotation of motor 51. The slotter head 75 is controlled by operating the motor 51 in the proper direction and controlling the engagement of friction clutch 250—251 by the hand lever 252.

Although I have described preferred embodiments for effecting the angular control of a slotter head and also for effecting the angular and/or axial adjustment of a printer drum semi-automatically by merely operating suitable levers, it will be understood that various modifications are feasible which still fall within the broader spirit and scope of my present invention and are adaptable to rotating drums in general, and not specifically to the machine of my preferred illustration, and accordingly I do not intend to be limited except as set forth in the following claims.

I claim:

1. A running adjusting means for a driven shaft adapted to be rotated by a gear comprising: a driving connection between said gear and said shaft including means for angularly adjusting said shaft with respect to said gear, and a housing sleeve secured to said gear; said angular adjusting means comprising an angular adjusting sleeve concentric within said housing sleeve and keyed to said shaft, and means interposed between said sleeves for changing the angular relation between said angular adjusting sleeve and said housing sleeve.

2. A running adjusting means for a driven shaft adapted to be rotated by a gear comprising: a driving connection between said gear and said shaft including means for angularly adjusting said shaft with respect to said gear, and a housing sleeve secured to said gear; said angular adjusting means comprising an angular adjusting sleeve concentric within said housing sleeve and keyed to said shaft, means interposed between said sleeves for changing the angular relation between said angular adjusting sleeve and said housing sleeve comprising an angular adjusting worm gear integral with said angular adjusting sleeve, an angular worm coacting with said angular adjusting worm gear and an angular adjusting worm shaft rotatably mounted on said housing sleeve connected to said angular adjusting worm, and means for controlling said angular adjusting means operatively connected to said angular adjusting worm shaft.

3. A running adjusting means for a driven shaft adapted to be rotated by a gear comprising: a driving connection between said gear and said shaft including means for angularly adjusting said shaft with respect to said gear, and a housing sleeve secured to said gear; said angular adjusting means comprising an angular adjusting sleeve concentric within said housing sleeve and keyed to said shaft, means interposed between said sleeves for changing the angular relation between said angular adjusting sleeve and said housing sleeve and means for controlling said angular adjusting means; said angular control means comprising an angular control rod, an angular control gear rotatably mounted on said angular control rod, and means for establishing a drive connection between said angular control rod and gear.

4. A running adjusting means for a driven shaft adapted to be rotated by a gear comprising: a driving connection between said gear and said shaft including means for angularly adjusting said shaft with respect to said gear, and a housing sleeve secured to said gear; said angular adjusting means comprising an angular adjusting sleeve concentric about and keyed to said shaft, means for changing the angular relation between said angular adjusting sleeve and said housing sleeve, and means for controlling said angular adjusting means; said angular control means comprising an angular control rod, an angular control gear rotatably mounted on said angular control rod, and means for establishing a drive connection between said angular control rod and gear; and means for operating said control means comprising a source of motive power, an intermediate gear meshing with said angular control gear, and means for driving said intermediate gear by said source.

5. A running adjusting means for a driven shaft adapted to be rotated by a gear comprising: a positive driving connection between said gear and said shaft including means for angularly adjusting said driven shaft with respect to said gear, means for axially adjusting said driven shaft with respect to said gear, and a housing sleeve secured to said gear; said angular adjusting means comprising an angular adjusting sleeve concentric about and slidably secured to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, and an angular adjusting worm shaft connected to said angular adjusting worm journalled in said housing sleeve, and means for controlling said angular adjusting means; said angular control means comprising an angular control rod operatively connected with said angular adjusting worm shaft extending parallel to said driven shaft and journalled in said housing sleeve, an angular control gear rotatably mounted on said angular control rod and means for establishing a positive drive connection between said angular control rod and gear including a positive clutch and an angular control lever for engaging said clutch; and means for operating said control means comprising a source of motive power, means for reversibly driving said source of motive power, an intermediate gear coaxial with said cylinder and meshing with said angular control gear, means for driving said intermediate gear by said source including a friction clutch, and an operating lever for engaging said friction clutch.

6. A running adjusting means for a driven shaft adapted to be rotated by a gear comprising: a driving connection between said gear and said shaft, means for axially adjusting said shaft with respect to said gear and a housing sleeve secured to said gear; said axial adjusting means comprising an axial adjusting sleeve concentric within said housing sleeve, means for angularly displacing said axial adjusting sleeve with respect to said housing sleeve, and means for translating the angular displacement of said axial adjusting sleeve into a corresponding axial displacement of said driven shaft.

7. A running adjusting means for a driven shaft adapted to be rotated by a gear comprising: a driving connection between said gear and said shaft, means for axially adjusting said driven shaft with respect to said gear, and a housing sleeve secured to said gear; said axial adjusting means comprising an axial adjusting sleeve concentric within said housing sleeve, means for angularly displacing said axial adjusting sleeve with respect to said housing sleeve comprising an axial adjusting worm gear integral with said axial adjusting sleeve, an axial adjusting worm coacting with said axial adjusting worm gear and an axial adjusting worm shaft connected to said axial adjusting worm, and means for translating said angular displacement into a corresponding axial displacement of said driven shaft, and means for controlling said axial adjusting means operatively connected to said axial adjusting worm shaft.

8. A running adjusting means for a driven shaft adapted to be rotated by a gear comprising: a driving connection between said gear and said shaft, means for axially adjusting said cylinder with respect to said gear, and a housing sleeve secured to said gear; said axial adjusting means comprising an axial adjusting sleeve concentric within said housing sleeve, means for angularly displacing said axial adjusting sleeve with respect to said housing sleeve and means for translating said angular displacement into a corresponding axial displacement of said drum comprising an externally threaded sleeve rotatably mounted on said drum shaft, and internal threading for said axial adjusting sleeve coacting with said externally threaded sleeve.

9. A running adjusting means for a driven shaft adapted to be rotated by a gear comprising: a driving connection between said gear and said shaft, means for axially adjusting said cylinder with respect to said gear, and a housing sleeve secured to said gear; said axial adjusting means comprising an axial adjusting sleeve concentric within said housing sleeve, means for angularly displacing said axial adjusting sleeve with respect to said housing sleeve comprising an axial adjusting worm gear integral with said axial adjusting sleeve, an axial adjusting worm coacting with said axial adjusting worm gear, and an axial adjusting worm shaft connected to said axial adjusting worm, journalled in said housing sleeve, and means for translating angular displacement into a corresponding axial displacement of said drum comprising an externally threaded sleeve rotatably mounted on said drum shaft, internal threading for said axial adjusting sleeve coacting with said externally threaded sleeve, said axial adjusting sleeve being fixed against axial displacement and said externally threaded sleeve being held against axial movement on said drum shaft, and means for controlling said axial adjusting means operatively connected to said axial adjusting worm shaft.

10. A running adjusting means for a driven shaft adapted to be rotated by a gear comprising: a positive driving connection between said gear and said shaft including means for angularly adjusting said drum with respect to said gear, means for axially adjusting said drum with respect to said gear, and a housing sleeve secured to said gear; said axial adjusting means comprising an axial adjusting sleeve concentric within said housing sleeve, means for angularly displacing said axial adjusting sleeve with respect to said housing sleeve, means for translating said angular displacement into a corresponding axial displacement of said drum and means for controlling said axial adjusting means; said axial adjusting control means comprising an axial control rod, an axial control gear rotatably mounted on said axial control rod, and means for establishing a drive connection between said axial control rod and gear.

11. A running adjusting means for a driven shaft adapted to be rotated by a gear comprising: a positive driving connection between said gear and said shaft including means for angularly adjusting said drum with respect to said gear, means for axially adjusting said drum with respect to said gear, and a housing sleeve secured to said gear; said axial adjusting means comprising an axial adjusting sleeve concentric within said housing sleeve, means for angularly displacing said axial adjusting sleeve with respect to said housing sleeve, means for translating said angular displacement into a corresponding axial displacement of said drum, and means for controlling said axial adjusting means; said axial adjusting control means comprising an axial control rod, an axial control gear rotatably mounted on said axial control rod, and means for establishing a drive connection between said axial control rod and gear; and means for operating said control means comprising a source of motive power, an intermediate gear meshing with said axial control gear, and means for driving said intermediate gear by said source.

12. A running adjusting means for a driven shaft and a gear for driving said shaft comprising: of a positive driving connection between said gear and said shaft including means for angularly adjusting said driven shaft with respect to said gear, means for axially adjusting said driven shaft with respect to said gear, and a housing sleeve secured to said gear; said axial adjusting means comprising an axial adjusting sleeve concentric within said housing sleeve, means for angularly displacing said axial adjusting sleeve with respect to said housing sleeve comprising an axial adjusting worm gear integral with said axial adjusting sleeve, an axial adjusting worm coacting with said axial adjusting worm gear, an axial adjusting worm shaft connected to said axial adjusting worm journalled in said housing sleeve, means for translating said angular displacement into a corresponding axial displacement of said driven shaft comprising an externally threaded sleeve rotatably mounted on said driven shaft, internal threading for said axial adjusting sleeve coacting with said externally threaded sleeve, said axial adjusting sleeve being fixed against axial displacement and said externally threaded sleeve being held against axial movement on said driven shaft, and means for controlling said axial adjusting means operatively connected to said axial adjusting worm shaft; said axial adjusting control means comprising an axial control rod operatively connected with said axial adjusting worm shaft extending parallel to the axis of said driven shaft and journalled in said housing sleeve, an axial control gear rotatably mounted on said axial control rod, means for establishing a positive drive connection between said axial control rod and gear including a positive clutch and an axial control lever for engaging said clutch; and means for operating said control means comprising a source of motive power, means for reversibly driving said source of motive power, an intermediate gear coaxial with said driven shaft and meshing with said axial control gear, means for driving said intermediate gear by said source including a friction clutch and an operating lever for engaging said friction clutch and a reversible electric motor.

13. A running adjusting means for a driven shaft and a gear for driving said shaft comprising: a positive driving connection between said gear and said shaft including means for angularly adjusting said driven shaft with respect to said gear, means for axially adjusting said driven shaft with respect to said gear, and a housing sleeve secured to said gear; said angular adjusting means comprising an angular adjusting sleeve concentric about and keyed to said shaft, and means for changing the angular relation between said angular adjusting sleeve and said housing sleeve; said axial adjusting means comprising an axial adjusting sleeve concentric within said housing sleeve, means for angularly displacing said axial adjusting sleeve with respect to said housing sleeve, and means for translating said angular displacement into a corresponding axial displacement of said cylinder.

14. A running adjusting means for a driven shaft and a gear for driving said shaft comprising: a positive driving connection between said gear and said shaft including means for angularly adjusting said driven shaft with respect to said gear, means for axially adjusting said driven shaft with respect to said gear, and a housing sleeve secured to said gear; said angular adjusting means comprising an angular adjusting sleeve concentric about and slidably keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means operatively connected to said angular adjusting worm shaft; said axial adjusting means comprising an axial adjusting sleeve concentric within said housing sleeve, means for angularly displacing said axial adjusting sleeve with respect to said housing sleeve comprising an axial adjusting worm gear integral with said axial adjusting sleeve, an axial adjusting worm coacting with said axial adjusting worm gear, an axial adjusting worm shaft connected to said axial adjusting worm journalled in said housing sleeve, means for translating said angular displacement into a corresponding axial displacement of said driven shaft, comprising an externally threaded sleeve rotatably mounted on said driven shaft, internal threading for said axial adjusting sleeve coacting with said externally threaded sleeve, said axial adjusting sleeve being fixed against axial displacement and said externally threaded sleeve being held against axial movement on said driven shaft, and means for controlling said axial adjusting means operatively connected to said axial adjusting worm shaft.

15. A running adjusting means for a driven shaft and a gear for driving said shaft comprising: a positive driving connection between said gear and said shaft including means for angularly adjusting said drum with respect to said gear, means for axially adjusting said drum with respect to said gear, and a housing sleeve secured to said gear; said angular adjusting means comprising an angular adjusting sleeve concentric about and keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means; said angular control means comprising an angular control rod, an angular control gear rotatably mounted on said angular control rod, and means for establishing a drive connection between said angular control rod and gear; said axial adjusting means comprising an axial adjusting sleeve concentric within said housing sleeve, means for angularly displacing said axial adjusting sleeve with respect to said housing sleeve, means for translating said angular displacement into a corresponding axial displacement of said drum, and means for controlling said axial adjusting means; said axial adjusting control means comprising an axial control rod, an axial control gear rotatably mounted on said axial control rod and means for establishing a drive connection between said axial control rod and gear.

16. A running adjusting means for a driven shaft and a gear for driving said shaft comprising: a positive driving connection between said gear and said shaft including means for angularly adjusting said drum with respect to said gear, means for axially adjusting said drum with respect to said gear, and a housing sleeve secured to said gear; said angular adjusting means comprising an angular adjusting sleeve concentric about and keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means; said angular control means comprising an angular control rod, an angular control gear rotatably mounted on said angular control rod, and means for establishing a drive connection between said angular control rod and gear; said axial adjusting means comprising an axial adjusting sleeve concentric within said housing sleeve, means for angularly displacing said axial adjusting sleeve with respect to said housing sleeve, means for translating said angular displacement into a corresponding axial displacement of said drum, and means for controlling said axial adjusting means; said axial adjusting control means comprising an axial control rod, an axial control gear rotatably mounted on said axial control rod, and means for establishing a drive connection between said axial control rod and gear; and means for operating said angular and axial control means comprising a source of motive power, an intermediate gear coaxial with said drum and meshing with said angular and axial control gears and means for driving said intermediate gear by said source.

17. A running adjusting means for a driven shaft and a gear for driving said shaft comprising: a positive driving connection between said gear and said shaft including means for angularly adjusting said driven shaft with respect to said gear, means for axially adjusting said driven shaft with respect to said gear, and a housing sleeve secured to said gear; said angular adjusting means comprising an angular adjusting sleeve concentric about and slidably keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means; said angular control means comprising an angular control rod operatively connected with said angular adjusting worm shaft extending parallel to said driven shaft and journalled in said housing sleeve, an angular control gear rotatably mounted on said angular control rod and means for establishing a positive drive connection between said angular control rod and gear including a positive angular control clutch and an angular control lever for engaging said angular control clutch; said axial adjusting means comprising an axial adjusting sleeve concentric within said housing sleeve, means for angularly displacing said axial adjusting sleeve with respect to said housing sleeve, comprising an axial adjusting worm gear integral with said axial adjusting sleeve, an axial adjusting worm coacting with said axial adjusting worm gear, an axial adjusting worm shaft connected to said axial adjusting worm journalled in said housing sleeve, means for translating said angular displacement into a corresponding axial displacement of said driven shaft comprising an externally threaded sleeve rotatably mounted on said driven shaft, internal threading for said axial adjusting sleeve coacting with said externally threaded sleeve, said axial adjusting sleeve being fixed against axial displacement and said externally threaded sleeve being held against axial movement on said driven shaft, and means for controlling said axial adjusting means; said axial adjusting control means comprising an axial control rod, operatively connected with said axial adjusting shaft, extending parallel to the axis of said driven shaft and journalled in said housing sleeve, an axial control gear rotatably mounted on said axial control rod, means for establishing a positive drive connection between said axial control rod and gear including a positive axial control clutch and an axial control lever for engaging said axial control clutch.

18. A running adjusting means for a driven shaft and a gear for driving said shaft comprising: a positive driving connection between said gear and said shaft including means for angularly adjusting said driven shaft with respect to said gear, means for axially adjusting said driven shaft with respect to said gear, and a housing sleeve secured to said gear; said angular adjusting means comprising an angular adjusting sleeve concentric about and slidably keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means; said angular control means comprising an angular control rod operatively connected with said angular adjusting worm shaft extending parallel to said driven shaft and journalled in said housing sleeve, an angular control gear rotatably mounted on said angular control rod and means for establishing a positive drive connection between said angular control rod and gear including a positive angular control clutch and an angular control lever for engaging said angular control clutch; said axial adjusting means comprising an axial adjusting sleeve concentric within said housing sleeve, means for angularly displacing said axial adjusting sleeve with respect to said housing sleeve, comprising an axial adjusting worm gear integral with said axial adjusting sleeve, an axial adjusting worm coacting with said axial adjusting worm gear, an axial adjusting worm shaft connected to said axial adjusting worm journalled in said housing sleeve, means for translating said angular displacement into a corresponding axial displacement of said driven shaft comprising an externally threaded sleeve rotatably mounted on said driven shaft, internal threading for said axial adjusting sleeve coacting with said externally threaded sleeve, said axial adjusting sleeve being fixed against axial displacement and said externally threaded sleeve being held against axial movement on said driven shaft, and means for controlling said axial adjusting means; said axial adjusting control means comprising an axial control rod, operatively connected with said axial adjusting shaft, extending parallel to the axis of said driven shaft and journalled in said housing sleeve, an axial control gear rotatably mounted on said axial control rod, means for establishing a positive drive connection between said axial control rod and gear including a positive axial control clutch and an axial control lever for engaging said axial control clutch; and means for operating said angular and axial control means comprising a source of motive power, means for reversibly driving said source of motive power, an intermediate gear coaxial with said driven shaft and meshing with said angular and axial control gear, means for driving said intermediate gear by said source including a friction clutch and an operating lever for engaging said friction clutch and a reversible electric motor.

19. A running adjusting means for a driven shaft and a gear for driving said shaft comprising: a driving connection between said gear and said shaft including means for angularly adjusting said shaft with respect to said gear and a housing sleeve secured to said gear; said angular adjusting means comprising an angular adjusting sleeve concentric about and keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve and means for controlling said angular adjusting means operatively connected to said angular adjusting worm shaft; said angular control means comprising an angular control rod operatively connected with said angular adjusting worm shaft and an angular control gear secured to said angular control rod; and means for operating said control means, a reversible electric motor, and an intermediate gear meshing with said axial control gear.

20. A running adjusting means for a driven shaft and a gear for driving said shaft comprising: a driving connection between said gear and said shaft including means for angularly adjusting said shaft with respect to said gear, and a housing sleeve secured to said gear; said angular adjusting means comprising an angular adjusting sleeve concentric about and keyed to said shaft, means for changing the angular relation between said angular adjusting sleeve and said housing sleeve comprising an angular adjusting worm gear integral with said angular adjusting second sleeve, an angular adjusting worm coacting with said angular adjusting worm gear, an angular adjusting worm shaft connected to said angular adjusting worm journalled in said housing sleeve, and means for controlling said angular adjusting means operatively connected to said angular adjusting worm shaft; said angular control means comprising an angular control rod operatively connected with said angular adjusting worm shaft extending parallel to said driven shaft and journalled in said housing sleeve, and an angular control gear secured to said angular control rod; and means for operating said control means, a reversible electric motor, an intermediate gear coaxial with said driven gear and meshing with said angular and axial control gears, means for driving said intermediate gear by said motor including a friction clutch and an operating lever for engaging said friction clutch.

FRANK S. SHIELDS.